United States Patent
Kim et al.

(10) Patent No.: US 9,661,574 B2
(45) Date of Patent: May 23, 2017

(54) METHOD AND SYSTEM FOR PROVIDING SLEEP STATE OF NETWORK-ACCESSIBLE TERMINAL

(71) Applicant: Electronics and Telecommunications Research Institute, Daejeon (KR)

(72) Inventors: Tae Joong Kim, Seongnam-si (KR); Hyun Soon Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 24 days.

(21) Appl. No.: 14/305,946

(22) Filed: Jun. 16, 2014

(65) Prior Publication Data

US 2015/0126257 A1 May 7, 2015

(30) Foreign Application Priority Data

Nov. 5, 2013 (KR) .................. 10-2013-0133611

(51) Int. Cl.
*H04W 52/02* (2009.01)

(52) U.S. Cl.
CPC ......... *H04W 52/0225* (2013.01); *Y02B 60/50* (2013.01)

(58) Field of Classification Search
CPC . H04W 8/005; H04W 84/18; H04W 52/0216; H04W 76/048; H04W 52/0225
See application file for complete search history.

(56) References Cited

U.S. PATENT DOCUMENTS

| | | | |
|---|---|---|---|
| 5,404,544 A * | 4/1995 | Crayford | G06F 1/3215 340/5.74 |
| 7,057,754 B1 * | 6/2006 | Tsuchiya | G06F 1/3287 358/1.13 |
| 8,428,079 B1 * | 4/2013 | Lambert | H04W 8/005 370/254 |
| 8,432,844 B2 | 4/2013 | Bae et al. | |
| 2002/0155818 A1 * | 10/2002 | Boros | H01Q 1/246 455/67.14 |
| 2004/0152495 A1 * | 8/2004 | Choi | H04W 52/0229 455/574 |

(Continued)

FOREIGN PATENT DOCUMENTS

KR     1020080030861 A     4/2008

OTHER PUBLICATIONS

Environment-Aware Clock Skew Estimation and Synchronization for Wireless Sensor Network by Yang et al., dated Mar. 2012.*

*Primary Examiner* — Daniel Lai
(74) *Attorney, Agent, or Firm* — William Park and Associates Ltd.

(57) ABSTRACT

Provided are a method and system for providing a sleep state in a device accessible to a wired or wireless network. Provided are a method and a system, which dynamically determine the optimal parameter in a sleep state depending on a network characteristic in providing the sleep state to a network-accessible terminal, and thus reduce the period of an active state of the network-accessible terminal, thereby considerably decreasing power consumption. Provided are a method and a system, which do not unnecessarily use a clock in an active state by selecting the optimal clock according to a purpose of transiting from the sleep state to the active state, and thus reduce the period of the active state of the network-accessible terminal, thereby considerably decreasing power consumption.

13 Claims, 3 Drawing Sheets

(56) References Cited

U.S. PATENT DOCUMENTS

| | | |
|---|---|---|
| 2007/0105568 A1 | 5/2007 | Nylander et al. |
| 2007/0165569 A1 | 7/2007 | Kaminski et al. |
| 2008/0081645 A1 | 4/2008 | Kim et al. |
| 2009/0017843 A1* | 1/2009 | Laroia ................ H04W 76/023 455/458 |
| 2011/0022716 A1* | 1/2011 | Diab ...................... H04L 12/12 709/231 |
| 2011/0116386 A1* | 5/2011 | Blanchard .............. H04B 7/155 370/242 |
| 2015/0067365 A1* | 3/2015 | Nakazima ......... H04W 52/0267 713/320 |

* cited by examiner

METHOD AND SYSTEM FOR PROVIDING SLEEP STATE OF NETWORK-ACCESSIBLE TERMINAL

CROSS-REFERENCE TO RELATED APPLICATIONS

This application claims priority under 35 U.S.C. §119 to Korean Patent Application No. 10-2013-0133611, filed on Nov. 5, 2013, the disclosure of which is incorporated herein by reference in its entirety.

TECHNICAL FIELD

The present invention relates to a method and system for providing a sleep state in a device accessible to a wired or wireless network, and more particularly, to a method and a system, which provide a sleep state to a network-accessible terminal to reduce the period of an active state of the network-accessible terminal, thereby considerably decreasing power consumption.

BACKGROUND

In devices accessible to a wired or wireless network, a sleep state is provided for reducing the period of an active state of each of the devices to considerably decrease power consumption.

Representative examples of network-accessible devices, which provide the sleep state, include cellular phones.

Since cellular phones receive an incoming call signal in a non-operating state, the cellular phones periodically check whether the incoming call signal arrives. Also, as a cellular phone moves, a camping cell is updated, and a position of the cellular phone is registered in a network, whereby it is unable to maintain the sleep state continuously. In addition, since an interrupt (for example, a key sense interrupt) that occurs when a cellular phone transmits an originating call signal is required to be processed within time delay that does not cause inconvenience to a user, it is unable to maintain the sleep state continuously.

Therefore, much development has been made for technology that maintains the sleep state of a cellular phone for as long as possible to reduce power consumption, and thus increases a call waiting time of the cellular phone.

Recently, due to the explosive increase in wireless traffic, various access methods are being provided for offloading of limited traffic in cellular mobile communication, and Wi-Fi is attracting much attention as a representative method of the various access methods.

In a wireless LAN, a wireless local area network (LAN) access point (AP) is installed at a wired network termination, and by providing communication between the wireless LAN AP and a wireless LAN device, traffic that uses cellular mobile communication is effectively distributed to a wired network. However, the wireless LAN still adds to the traffic load of a wired network.

To solve such a problem, application of direct communication technology that provides communication in a limited space without using the wired network and a wireless network is increasingly expanded. Examples of the direct communication technology include Bluetooth technology, which is performed with low power at a very close distance, and Wi-Fi P2P technology that uses wireless LAN technology and provides direct communication.

Hereinafter, requirements that are provided for the sleep state in a wireless network in consideration of a characteristic of the direct communication will be described with the Wi-Fi P2P technology as an example.

FIG. 1a and FIG. 1b illustrate a device discovering process using Wi-Fi P2P. Hereinafter, a device-to-device communication device recognizing process based on Wi-Fi P2P technology standard that is a related art device-to-device communication scheme will be described.

A first P2P device 10 based on the Wi-Fi P2P technology standard may be activated by a first application unit 11 that is configured with an SME, an application, a user, and a vendor which correspond to the first P2P device 10. The activation is performed according to a device discovery command. When the device discovery command is received, the first P2P device 10 transits to a scan state 12 for searching for a candidate frequency channel, and search for all frequency channels. In FIG. 1a and FIG. 1b, it is assumed that frequency channels CH1, CH6 and CH11 are searched in the scan state 12.

Similarly to the first P2P device 10, a second P2P device 20 based on the Wi-Fi P2P technology standard may be activated by a second application unit 21 that is configured with an SME, an application, a user, and a vendor which correspond to the second P2P device 20. Also, similarly to the first P2P device 10, the second P2P device 20 may be activated according to a device discovery command. When the device discovery command is received, the second P2P device 20 transits to a scan state 22 for searching for a candidate frequency channel, and search for all the frequency channels. In FIG. 1a and FIG. 1b, it is assumed that the frequency channel CH6 is searched in the scan state 22.

Subsequently, the first P2P device 10 that has searched for the frequency channels in the scan state 12 transits to a listening state 13. The listening state 13 is a state in which the first P2P device 10 performs an operation of listening to whether a connection request message arrives from the other adjacent device, and a time of the listening state 13 is determined by using a value T1 which is arbitrarily selected. That is, the first P2P device 10 preferentially listens to a connection request signal for an arbitrarily selected time after the search of the frequency channels is completed in the scan state 12.

Moreover, the second P2P device 20 that has searched for the frequency channels in the scan state 22 transits to a listening state 23, and performs an operation of listening to whether a connection request message arrives from the other adjacent device.

When the first P2P device 10 that ends the search does not listen to the connection request message in the listening state 13, the first P2P device 10 transits to a search state 14. In the search state 14, the first P2P device 10 transmits the connection request signal for each of frequency channels that are acquired in the scan state 12.

In FIG. 1a and FIG. 1b, it is illustrated that the first P2P device 10 transmits the connection request signal at each of the frequency channels CH1, CH6 and CH11 that are acquired in the scan state 12, and performs an operation of searching for whether a connection response message arrives from the other adjacent P2P device. At this time, since the second P2P device 20 is in the listening state 23, the second P2P device 20 receives the connection request signal transmitted from the first P2P device 10 by using the frequency channel CH6, and in response to the connection request signal, the second P2P device 20 transmits a connection response message to the first P2P device 10.

The first P2P device 10 transmits the connection request signal for each of all the frequency channels that are acquired in the scan state 12, and checks whether the connection response message responding to the connection request signal arrives. In FIG. 1a and FIG. 1b, it is assumed that only the second P2P device 20 transmits the connection response message at the channel CH6.

Through the above-described process, the first application unit 11 of the first P2P device 10 finds the other adjacent P2P device, and establishes a communication link with the found P2P device.

However, in the communication link establishing process of the Wi-Fi P2P device, in addition to a Wi-Fi P2P device for establishing the communication link, a target Wi-Fi P2P device is in an activated state. Therefore, the Wi-Fi P2P device is targeted for communication at any time, and thus is activated for using the above-described scheme irrespective of an intention of establishing the communication link. For this reason, the communication link establishing process is very inefficient in terms of power consumption.

Moreover, in the communication link establishing process of the Wi-Fi P2P device, a Wi-Fi P2P device for establishing the communication link transits to the scan state 12, the listening state 13, or the search state 14. Here, a section length of the listening state 13 is arbitrarily selected, and thus, a collision of state occurs between the Wi-Fi P2P device and the other adjacent Wi-Fi P2P devices.

For example, when the first P2P device 10 is in the listening state 13 and the second P2P device 20 is in the listening state 23, only a time for establishing the communication link is consumed, and any operation is not performed. Also, when the first and second P2P devices 10 and 20 are in the respective search states 14 and 24 at the same time, the connection response message is not transmitted despite the connection request message being received, and for this reason, only a time for establishing the communication link is consumed.

Moreover, in the communication link establishing process of the Wi-Fi P2P device, the connection request message and the connection response message are received and transmitted in a state where a time is not synchronized and a gain is not adjusted, and thus, the communication link is established in a state where a quality of the communication link is degraded. Therefore, in a case of using communication link establishing process of the Wi-Fi P2P device, a length of a signal necessary to enhance the quality of the communication link increases, causing degradation in efficiency. In addition, when the length of the signal is reduced, a coverage in which the communication link is established is reduced because the quality of the communication link is degraded.

As described above, in devices that ensure mobility as in cellular phones, research is widely done for technology that reduces power consumption by using the sleep state. Also, devices that provide a connection of a wireless network such as Wi-Fi or the like do not perform a process of receiving an incoming call signal, but uses technology that reduces power consumption by using the sleep state.

However, research for reducing power consumption by using the sleep state is hardly done for devices in which power may be always supplied as in a device connected to a wired network or a device that is connected to a wireless network under an environment in which mobility is restricted. However, in devices (where power consumption in a standby state is very high) among devices where power may be always supplied as in set-top boxes, a necessity of reducing the power consumption in the standby state to increase the saving effect of energy is increasing.

Recently, devices such as set-top boxes support the wireless network such as Wi-Fi or the like in a state of being connected to the wired network such as Ethernet or the like, and thus, it is required to develop technology that reduces power consumption in the standby state by supporting the sleep state in a device connected to the wired network or the wireless network.

Therefore, it is required to develop a method and a system which reduce power consumption in the standby state and enables the transition between the sleep state and the active state without any time delay by effectively supporting the sleep state in a device accessible to the wired network or the wireless network.

SUMMARY

Accordingly, the present invention provides a method and a system, which dynamically determine the optimal parameter in a sleep state depending on a network characteristic in providing the sleep state to a network-accessible terminal, and thus reduce the period of an active state of the network-accessible terminal, thereby considerably decreasing power consumption.

The present invention also provides a method and a system, which do not use a wasteful clock in an active state by selecting an optimal clock according to a purpose of transition of a sleep state to the active state, and thus reduce the period of the active state of the network-accessible terminal, thereby considerably decreasing power consumption.

In one general aspect, a system for providing a sleep state of a network-accessible terminal includes: a sleep state control unit configured to, when the network-accessible terminal is in the sleep state, periodically determine whether a condition for transiting to an active state is satisfied, by using a parameter stored in the network-accessible terminal, and when the condition is satisfied, transit to the active state; and a network signal detecting unit configured to, when the network-accessible terminal is in the active state, detect a network signal after a required operation is completed, and adjust the parameter, based on the detected signal.

The network signal detecting unit may measure traffic of a wired network, and adjusts the parameter, based on the traffic.

The system may further include an adjacent device scanning unit configured to scan a network-accessible adjacent device when the network-accessible terminal is in the sleep state and the condition for transiting to the active state is not satisfied.

The adjacent device scanning unit may perform a scan preparing operation of preparing a radio frequency for scanning the network-accessible adjacent device, and when the scan preparing operation is completed, the adjacent device scanning unit may scan the network-accessible adjacent device.

When the network-accessible adjacent device is discovered, the adjacent device scanning unit may transit the network-accessible terminal to the active state, and when the network-accessible adjacent device is not discovered, the adjacent device scanning unit may stay the network-accessible terminal to the sleep state.

When the network-accessible adjacent device is not discovered, the adjacent device scanning unit may perform a slew estimating operation of correcting a timing, and transit the network-accessible terminal to the sleep state.

After the slew estimating operation is performed, depending on a case, the adjacent device scanning unit may adjust the parameter which is to be used in the sleep state, and transit the network-accessible terminal to the sleep state.

The sleep state control unit may determine whether the condition for transiting to the active state is satisfied, based on at least one of a user interrupt such as power-on of a remote controller, presence of input traffic from a network, and an interrupt based on a period in which adjacent network supporting devices are scanned.

When the condition for transiting to the active state is satisfied, the sleep state control unit may check a required operation in the active state and select an optimal operation clock, based on the checked operation.

When the network-accessible terminal is powered on, the sleep state control unit may perform an operation of initializing the network-accessible terminal, and when there is not any more required operation, the sleep state control unit may transit to the sleep state.

In another general aspect, a method of providing a sleep state of a network-accessible terminal includes: when the network-accessible terminal is powered on, transiting to the sleep state; periodically waking up by using a parameter stored in the network-accessible terminal to determine whether a condition for transiting to an active state is satisfied, in the sleep state; when the condition is satisfied, transiting to the active state; and performing a required operation, and detecting a network signal to adjust the parameter, in the active state.

The adjusting of the parameter may include, measuring traffic of a wired network before transiting to the sleep state after performance of the required operation in the active state, and adjusting a period in which the network-accessible terminal wakes up in the sleep state, based on the characteristics of the measured traffic.

The transiting to the active state may include checking a required operation in active state and selecting an optimal operation clock, based on the checked operation.

The transiting to the sleep state may include, when the network-accessible terminal is powered on, initializing the network-accessible terminal, and when there is not any more required operation, transiting to the sleep state.

The method may further include, when the condition for transiting to the active state is not satisfied, scanning network-accessible adjacent devices.

The scanning of network-accessible adjacent devices may include: when the network-accessible adjacent devices are detected, performing a probe request and response operation for connection of a wireless network to discover a network-accessible adjacent device; and when the network-accessible adjacent device is discovered, transiting the network-accessible terminal to the active state, and when the network-accessible adjacent device is not discovered, transiting the network-accessible terminal to the sleep state.

The scanning of network-accessible adjacent devices may include: when the network-accessible adjacent devices are not detected, performing a slew estimating operation of correcting a timing; and after the slew estimating operation is performed, adjusting a parameter which is to be used in the sleep state, and transiting the network-accessible terminal to the sleep state, depending on a case.

Other features and aspects will be apparent from the following detailed description, the drawings, and the claims.

DETAILED DESCRIPTION OF EMBODIMENTS

Figure 1A:
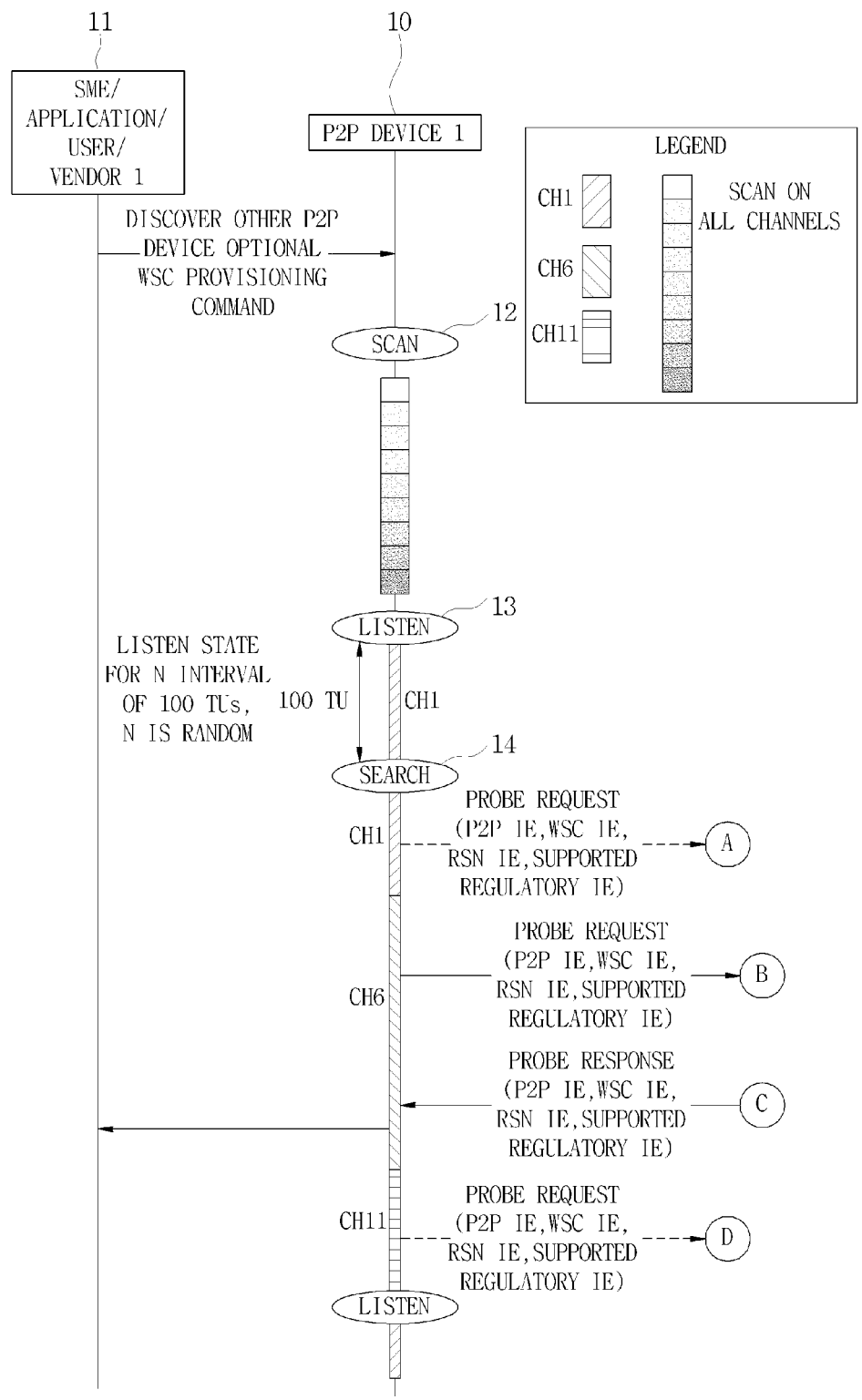
FIG. 1a and FIG. 1b are flowcharts illustrating a device discovering process using Wi-Fi P2P.
Figure 1B:
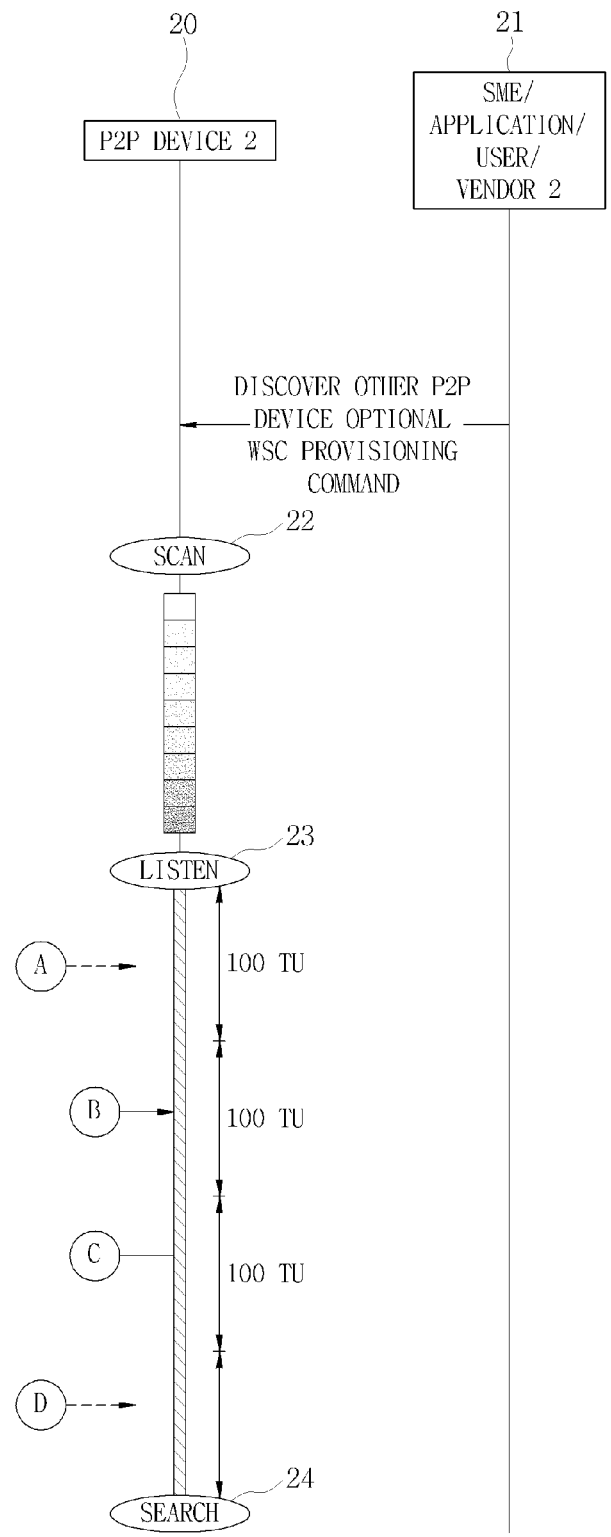

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings.

In providing a sleep state to a network-accessible terminal according to an embodiment of the present invention, the network-accessible terminal determines a state by periodically checking an transition condition, and an operation of the network-accessible terminal includes a sleep state in which an inactive mode is maintained for the period other than the determination operation, an active state in which a function of the network-accessible terminal is normally performed, and an activation preparing state in which a preparation operation such as a network connection is performed for supporting the required operation in the sleep state.

The transition condition from the sleep state to the active state includes a user interrupt such as the power-on of a remote controller, the presence of input traffic from a network, and an interrupt based on a period in which adjacent network supporting devices are scanned.

Under the active state transiting condition in the sleep state, an operation necessary for activation may be checked, and the optimal operation clock may be selected based on the checked operation.

For example, when the active state transiting condition is a power-on interrupt of a remote controller, the active state transiting condition may be set to select an operation clock having the maximum speed because all functions should be normally performed. When the active state transiting condition is an interrupt for determining the presence of traffic input from a network, the active state transiting condition may be set to select an operation clock having a medium speed because only an operation of determining the presence of network data is performed. When the active state transiting condition is for searching for adjacent network supporting devices, the active state transiting condition may be set to select an operation clock having the lowest speed because only hardware for a search function is separately performed.

In the active state, an operation is completed, and a signal characteristic of a wired network or a wireless network is detected before transiting to the sleep state. Therefore, the detected signal characteristic is used as a parameter for determining a search period.

Hereinafter, embodiments of the present invention will be described in detail to be easily embodied by those skilled in the art with reference to FIG. 2. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout.

Figure 2:
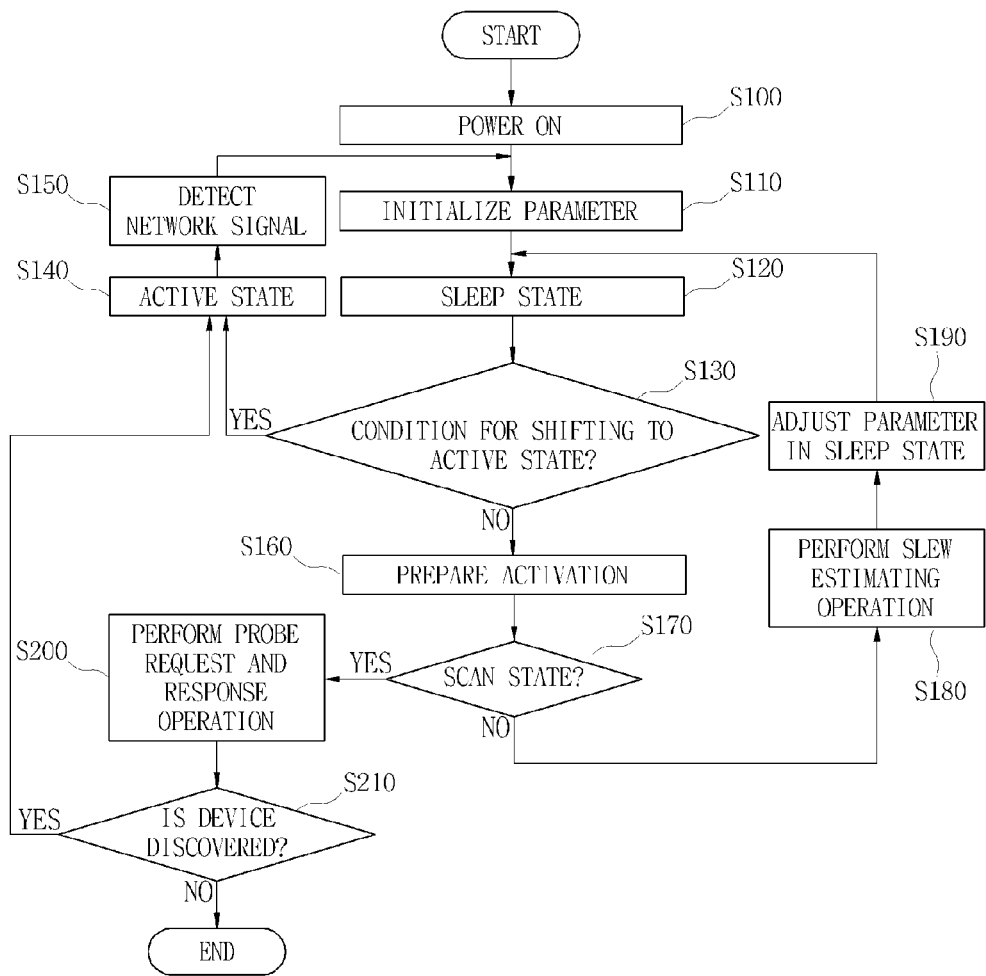
FIG. 2 is a flowchart illustrating a method of providing a sleep state to a network-accessible terminal according to an embodiment of the present invention.

FIG. 2 is a flowchart illustrating a method of providing the sleep state to the network-accessible terminal according to an embodiment of the present invention.

Hereinafter, when the network-accessible terminal is powered on in operation S100, the network-accessible terminal performs an operation of initializing a device in operation S110, and when there is no operation that is performed, the network-accessible terminal transits to the sleep state in operation S120. Here, when an operation is needed, the network-accessible terminal may transit to the active state.

In the sleep state, the network-accessible terminal periodically wakes up by using an internally stored parameter to determine whether a condition for transiting to the active state is satisfied in operation S130, and when the transiting condition is satisfied, the network-accessible terminal transits to the active state in operation S140. The network-accessible terminal performs a necessary operation in the active state, and after the operation is completed, the network-accessible terminal performs a network signal detecting operation before transiting to the sleep state in operation S150.

In such a process, the network-accessible terminal measures traffic of the wired network to determine a period in which the network-accessible terminal wakes up in the sleep state, based on the measured traffic characteristic. Here, the network-accessible terminal measures the traffic of the wired network by using an inter-traffic interval and a traffic length.

For example, when a measured inter-traffic interval of a network is large, a sleep period is long set so that the network-accessible terminal wakes up more slowly. When the measured inter-traffic interval of the network is short, the sleep period is shortly set so that the network-accessible terminal wakes up more frequently. When a measured traffic length of the network is long, the sleep period is shortly set so that the network-accessible terminal wakes up more frequently. When the measured traffic length of the network is short, the sleep period is long set so that the network-accessible terminal wakes up more slowly.

On the other hand, when the transiting condition is not satisfied, the network-accessible terminal performs a scan preparing operation that prepares a radio frequency (RF) for additionally scanning adjacent devices accessible to the wireless network in operation S160. After the scan preparing operation is completed, the network-accessible terminal scans the adjacent devices accessible to the wireless network in operation S170.

When the adjacent devices accessible to the network are detected in the scan operation, the network-accessible terminal performs a probe request and response operation for connection of the wireless network in operation S200, and the network-accessible terminal performs an operation of discovering the adjacent devices accessible to the network in operation S210.

Here, when an adjacent device accessible to the network is discovered, the network-accessible terminal transits to the active state in operation S140, but when an adjacent device accessible to the network is not discovered, the network-accessible terminal transits to the sleep state.

When the adjacent devices accessible to the network are not detected in the scan operation, the network-accessible terminal performs a slew estimating operation of correcting a timing in operation S180. Subsequently, depending on the case, the network-accessible terminal adjusts a parameter which is to be used in the sleep state in operation S190, and then transits to the sleep state in operation S120.

As described above, the present invention dynamically determines the optimal parameter in the sleep state depending on a network characteristic in providing the sleep state to a network-accessible terminal, and thus reduces the period of the active state of the network-accessible terminal, thereby considerably decreasing power consumption.

The present invention does not unnecessarily use a clock in the active state by selecting the optimal clock according to a purpose of transiting the sleep state to the active state, and thus reduces the period of the active state of the network-accessible terminal, thereby considerably decreasing power consumption.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for providing a sleep state of a wired network-accessible terminal, the system comprising:
   a sleep state control unit configured to, when the wired network-accessible terminal is in the sleep state, periodically determine whether a condition for transiting to an active state is satisfied, by using a parameter stored in the wired network-accessible terminal, and when the condition is satisfied, transit to the active state;
   a network signal detecting unit configured to, when the wired network-accessible terminal is in the active state, detect a network signal after a required operation is completed, and adjust the parameter, based on the detected signal, and
   an adjacent device scanning unit configured to scan a network-accessible adjacent device when the wired network-accessible terminal is in the sleep state and the condition for transiting to the active state is not satisfied,
   wherein when the network-accessible adjacent device is not discovered, the adjacent device scanning unit performs a slew estimating operation of correcting a timing and transits the wired network-accessible terminal to the sleep state.

2. The system of claim 1, wherein the network signal detecting unit measures traffic of a wired network, and adjusts the parameter, based on the traffic.

3. The system of claim 1, wherein the adjacent device scanning unit performs a scan preparing operation of preparing a radio frequency for scanning the network-accessible adjacent device, and when the scan preparing operation is completed, the adjacent device scanning unit scans the network-accessible adjacent device.

4. The system of claim 1, wherein,
when the network-accessible adjacent device is discovered, the adjacent device scanning unit transits the wired network-accessible terminal to the active state, and
when the network-accessible adjacent device is not discovered, the adjacent device scanning unit transits the wired network-accessible terminal to the sleep state.

5. The system of claim 1, wherein after the slew estimating operation is performed, the adjacent device scanning unit adjusts the parameter which is to be used in the sleep state, and transits the wired network-accessible terminal to the sleep state.

6. The system of claim 1, wherein the sleep state control unit determines whether the condition for transiting to the active state is satisfied, based on at least one of a power-on of a remote controller, presence of traffic input from a network, and an interrupt based on a period in which adjacent network supporting devices are scanned.

7. The system of claim 1, wherein when the condition for transiting to the active state is satisfied, the sleep state control unit checks a required operation in activation to select an optimal operation clock, based on the checked operation.

8. The system of claim 1, wherein,
when the wired network-accessible terminal is powered on, the sleep state control unit performs an operation of initializing the wired network-accessible terminal, and
when there is no operation which is performed, the sleep state control unit transits to the sleep state.

9. A method of providing a sleep state of a wired network-accessible terminal, the method comprising:
when the wired network-accessible terminal is powered on, transiting to the sleep state;
periodically waking up by using a parameter stored in the wired network-accessible terminal to determine whether a condition for transiting to an active state is satisfied, in the sleep state;
when the condition is satisfied, transiting to the active state; and
performing a required operation, and detecting a network signal to adjust the parameter, in the active state, and
when the condition for transiting to the active state is not satisfied, scanning network-accessible adjacent devices,
wherein the scanning of network-accessible adjacent devices comprises performing a slew estimating operation of correcting a timing when the network-accessible adjacent devices are not detected, and after the slew estimating operation is performed, adjusting a parameter which is to be used in the sleep state, and transiting the wired network-accessible terminal to the sleep state.

10. The method of claim 9, wherein the adjusting of the parameter comprises performing the required operation in the active state, measuring traffic of a wired network before transiting to the sleep state, and adjusting a period in which the wired network-accessible terminal wakes up from the sleep state, based on the traffic.

11. The method of claim 9, wherein the transiting to the active state comprises checking a required operation in activation to select an optimal operation clock, based on the checked operation.

12. The method of claim 9, wherein the transiting to the sleep state comprises, when the wired network-accessible terminal is powered on, initializing the wired network-accessible terminal, and when there is no operation which is performed, transiting to the sleep state.

13. The method of claim 9, wherein the scanning of network-accessible adjacent devices further comprises:
performing a probe request and response operation for connection of a wireless network to discover a network-accessible adjacent device; and
when the network-accessible adjacent device is discovered, transiting the wired network-accessible terminal to the active state, and when the network-accessible adjacent device is not discovered, transiting the wired network-accessible terminal to the sleep state.

* * * * *